United States Patent Office 2,768,201
Patented Oct. 23, 1956

2,768,201

MANUFACTURE OF DICARBOXYLIC ACIDS BY OXIDATION

Norman C. Hill, Akron, Ohio, assignor to The C. P. Hall Company, Akron, Ohio, a corporation of Ohio No Drawing. Application March 17, 1952,
Serial No. 277,077

7 Claims. (Cl. 260—537)

This invention relates to the treatment of oxygenated products obtained in the Fischer-Tropsch and the Oxo processes, and in particular to the production of dicarboxylic acid from the oil-soluble or water-immiscible portion of these oxygenated products.

THE FISCHER-TROPSCH PROCESS

In the Fischer-Tropsch process carbon monoxide and hydrogen are formed by some modification of the water gas reaction. The carbon monoxide and hydrogen are then subjected to pressure and temperature and passed over a catalyst which results in the formation of hydrocarbons and the so-called oxygenated chemicals.

The Fischer-Tropsch process has taken several forms which are designated by different names. In the Synthine process, developed in Germany, cobalt-thoria is used as a catalyst and the pressures employed vary between 50 and 150 pounds per square inch while the temperatures employed are between 350 to 400° F. The hydrocarbons produced are 90 to 95 percent of the total production from this process while the oxygenated chemicals are 5 to 10 percent.

In the United States the process generally under consideration, and now in semi-plant operation, employs an iron-alkali catalyst, with pressures from 200 to 400 p. s. i. g. and temperatures of 550 to 650° F. The products here produced are hydrocarbon 75 percent and oxygenated chemicals 25 percent.

The Fischer-Tropsch process is of interest because it permits the production of hydrocarbons ranging from gasoline to heavy lubricating oils and waxes. Its use is important in areas which do not have petroleum oil. As the known reserves of petroleum oil in the United States decrease, the Fischer-Tropsch process will become increasingly important. Beside the hydrocarbons produced, the oxygenated chemicals are produced in amount of 25 percent of the total production and if it is desirable the proportion of oxygenated chemicals can be increased to as much as 75 to 80 percent of the total production by a change of catalyst and the operating temperatures and pressures.

Another process was developed in Germany, known as the Synol process, but generally accepted as a modification of the Fischer-Tropsch process, in which an iron-alkali catalyst is employed at 18 to 25 atmospheres at temperatures of 190 to 200° C.

The term "Fischer-Tropsch process" will be used generally to refer to all such processes and products in which both hydrocarbons and oxygenated chemicals are produced simultaneously by the reaction of hydrogen and carbon monoxide.

In the process generally employed in the United States the yield of hydrocarbons would be as follows, based on the production of 100,000 barrels per day:

Table I

| | Barrels |
|---|---|
| Gasoline | 84,500 |
| Distillate fuel | 10,500 |
| Fuel oil and heavier | 5,000 |

These hydrocarbons are largely of the paraffin type ranging from methane to the solid waxes. The product is largely non-olefinic. The gasoline produced from this process has an ASTM octane number of approximately 80, and the heavier products are quite similar to those secured from petroleum.

On the basis of 100,000 barrels of hydrocarbons per day, the quantities of alcohols, acids, aldehyde and ketones which would be produced are indicated in Table II. In this table each type of oxygenated chemical is indicated and the number of carbon atoms per molecule contained in each of the oxygenated compounds in each of these types is separately specified:

Table II

[Millions of pounds of different oxygenated chemicals produced per year per 100,000 bbls. hydrocarbon per day.]

| | Alcohols | Acids | Aldehydes | Ketones |
|---|---|---|---|---|
| $C_1$ | 846 | 469 | 209 | 214 |
| $C_3$ | 232 | 142 | 60 | 62 |
| $C_4$ | 120 | 91 | 35 | 35 |
| $C_5$ | 71 | 56 | 21 | 21 |
| $C_6$ | 49 | 41 | 15 | 15 |
| $C_7$ | 33 | 30 | 10 | 11 |
| $C_8$ | 20 | 17 | 6 | 7 |
| $C_9$ | 15 | 11 | 4 | 5 |
| $C_{10}$ | 12 | 9 | 4 | 4 |
| Total | 1,398 | 866 | 364 | 374 |

A portion of the oxygenated chemicals leaves the process in the condensed water formed by the reaction and are called the water-soluble oxygenated chemicals. These include the following: methanol, ethanol, iso-propanol, n-propanol and a portion of the butanols and pentanols and some higher alcohols; acetaldehyde, propionaldehyde, butyraldehyde and some of the higher aldehydes; acetone, methyl ethyl ketone, and a portion of the methyl propyl, methyl butyl and higher ketones; acetic acid, propionic acid and a portion of the butyric, valeric and the higher mono carboxylic acids.

Beside the water-soluble oxygenated chemicals, large quantities of oil-soluble oxygenated chemicals are produced. On the basis of 100,000 barrels per day of hydrocarbons the following quantities of oil-soluble oxygenated chemicals would be produced:

Table III

OIL-SOLUBLE OXYGENATED CHEMICALS

| | Million pounds per year |
|---|---|
| Alcohols | 271 |
| Aldehydes and ketones | 278 |
| Acids (mostly monocarboxylic) | 274 |
| Total oil-soluble | 823 |

The oil-soluble chemicals contain some of the $C_4$ chemicals which would be dissolved in the water, if more water were present, but they are fundamentally the higher molecular weight alcohols, aldehydes, ketones and acids which are shown in Table II.

Considerable work has been done on the recovery of the water-soluble oxygenated chemicals up to and including the $C_4$ type. In all of the classes of compounds listed above the materials above $C_3$ are geenrally quite complex inasmuch as the higher aldehydes polymerize to form trimers of which para-n-butyraldehyde is an example, the acids and the alcohols react to form esters, while the aldehydes and alcohols react to form, for example, acetal. The aldehydes are unstable and are readily oxidized to monocarboxylic acids or two aldehyde molecules may react to form one molecule of alcohol and one molecule of acid. All in all, the oxygenated chemicals from a mixture of complex and unstable compounds which are difficult to recover, above the level of the C4 molecules, as pure compounds.

THE OXO PROCESS

The Oxo process employs carbon monoxide and hydrogen which react with olefins under pressures of 75 to as high as 3000 atmospheres and at temperatures of 150 to 300° C., and thus produce aldehydes containing one more carbon atom than the original olefin used. The aldehydes so produced may be converted to alcohols. The catalyst for the Oxo process is usually cobalt, with some admixture thereto.

The product is usually 60 percent branched and 40 percent straight chain, but this is necessarily greatly influenced by the type of olefin used in the reaction. The product is also greatly influenced by the shifting of the position of the double bond.

Ketones may also be formed by carbon monoxide adding to olefin molecules.

The chief secondary reactions are the formation of acids and alcohols by the reaction

$$2R\text{—}CHO + H_2O \rightarrow RCH_2OH + RCOOH$$

Esters may also be formed. As much as 20 percent of the total product may be obtained as a high-boiling oil, produced by the Aldol condensation reaction.

Thus, both the Fischer-Tropsch and the Oxo processes may produce oil, alcohols, acids, aldehydes, ketones and esters of four carbon atoms or more.

The alcohols produced in the Synol process are largely unbranched; while in the Oxo process the product is largely branched.

The products in both cases depend upon the catalyst, the temperature, the pressure, time of contact, $H_2:CO$ ratio of gases used; in the Oxo process all of the above variables effect the product as well as the composition of the olefin used. The oxygenated residue from the oil fraction of the Fischer-Tropsch process in certain respects resembles the oil-soluble product of the Oxo process. Both materials are mixtures which include alcohols, acids, aldehydes, ketones and esters, and both may contain straight- and branched-chain compounds of the above.

The oxidation process of this invention is applicable to both materials for the conversion of the compounds therein containing four or more carbons in a chain, with the intermediate carbons free from oxygen-containing substituents to produce dicarboxylic acids of varying chain lengths.

THE OXIDATION OPERATION

For the purpose of oxidation to dicarboxylic acids the raw materials must contain at least a four-carbon atom chain. On the oxidation of the chain, a more or less stable dicarboxylic acid is produced, e. g., succinic acid or dicarboxylic acids of higher molecular weight. The process is applicable to the treatment of compounds having longer chains than four carbons, such as those containing six or eight or ten or twelve carbon atoms or more. The process is not limited to the treatment of normal or straight-chain compounds but is applicable also to the oxidation of branched-chain compounds. On oxidation the carbons of the branch of the chain may be removed by oxidation decomposition, or they may be oxidized and each of the arms of the chain may form a carboxylic acid at its terminal carbon. On oxidation of unsaturated compounds there is scission of the chain and one or both of the terminal carbons of the resulting compounds are oxidized to carboxylic acids. Although monocarboxylic acids and semi-aldehydes may be formed, the process has particular value in the production of dicarboxylic acids.

Where ketones are present in the oxygenated residue from the Fischer-Tropsch oil-soluble chemicals, the ketone to be useful in this process must have more than four carbon atoms, i. e. a chain of at least four carbon atoms including the carbon atom to which the ketonic oxygen is attached. The process is applicable to the further oxidation of the oxygenated oil-soluble components as well as to the water-soluble oxygenated components which come within the description above. Thus the process is applicable to the oxidation of a Fischer-Tropsch residue of oxygenated chemicals, the components of which are composed largely of compounds in which there are chains of at least four carbons in length with no oxygen-containing substituents attached to the two intermediate carbons.

In the Fischer-Tropsch process water-soluble components of the reaction product are dissolved in the water formed in the process. The resulting water solution is separated from the water-insoluble or oil-soluble fraction by any suitable means. The composition of each of these two major fractions of the products will vary, depending on the temperature and pressure of the reaction, the catalyst employed, the time of reaction, and the temperature of the separation, etc. The water-soluble fraction will include, generally speaking, the oxygenated chemicals of one to four carbon atoms and small amounts of compounds containing more than four carbon atoms. Generally speaking, the oxygenated chemicals in the oil-soluble group are compounds containing more than four carbon atoms, and these are the more desirable for the oxidation process of this invention. The dividing line between what is oil soluble and what is water soluble will depend upon the temperature of the separation, the amount of water, alcohols and ketones present and their properties as solvents, etc., and in the refinement of the products certain of the oxygenated chemicals of four carbon atoms may be included in the starting material for use in this process.

The treatment of the oil-soluble fraction will vary. Some polar organic solvent may be used for extraction of the oxygenated chemicals. Also sulfur dioxide may be used according to the Edeleanu process or a modification thereof. More or less acid may be removed by treatment with aqueous caustic soda, etc., although the caustic operation may better be applied to the Edeleanu extract, which operation will make possible the recovery of the acids by saponification of the esters contained therein. The hydrocarbon residue will be distilled and purified for the recovery of gasoline, fuels, lubricants and waxes.

The oil-soluble fraction of oxygenated compounds has been found difficult of separation into pure chemicals, or commercial mixtures thereof. According to the process of this invention the oil-soluble oxygenated chemical fraction need not be broken down into components but the mixture, which may vary in composition, is subjected to oxidation by treatment with air or oxygen in the presence of nitric acid. The process is carried out at a temperature above 212° F. under sufficient pressure to maintain the nitric acid aqueous. The concentration of the acid may vary over a rather wide range, depending upon the products desired and other conditions under which the oxidation is carried out. The preferable strength of nitric acid is twenty to forty percent. Generally speaking, weaker acid produces a reaction too slow for commercial purposes at the temperatures at which it is desirable to operate, but on occasion concentrations as low as fifteen percent or lower may be employed. Higher concentrations than forty percent will generally be avoided because of the rapidity with which the oxidation occurs under usual operating conditions using such stronger acids, and further because of the liability of nitration, using much stronger acids such as those of sixty percent concentration and higher. However, such stronger acids may be used on occasion, but as lower temperatures.

Using nitric acid of high concentration the temperatures must be kept low, even lower than 212° F., to prevent nitration of the starting material and increase in the rate of oxidation. Using nitric acid as concentrated as 80 or 90 percent, or even up to 100 percent, the temperature is kept down preferably from 100 to 140° F., depending upon the nature of the material treated and the design of the equipment. When nitration occurs the reaction mixture generates heat; and the reaction may become violent. The lower molecular weight compounds produced by intensive oxidation will be formed. These are generally less desirable than the higher molecular weight products. Thus the high concentrations of nitric acid must be used with care, and preferably at relatively low temperatures. There are advantages in using higher concentrations of acids, because the higher the concentration the greater the speed of the reaction, etc. The disadvantages, however, of using higher concentrations include the decomposition of the dicarboxylic acids formed to lower homologues, resulting in a loss of carbon (yield), formation of more oxides of nitrogen which may result in higher nitric acid consumption, increase in the corrosiveness of the reaction mixture and its attack on the equipment, the cost of the strong nitric acid, etc. Thus, generally lower concentrations of nitric acid are preferred and will be used at temperatures above 212° F., but in properly designed equipment higher concentrations may be used.

The temperatures and pressures at which the process is carried out may likewise be varied over a wide range. This will depend, for example, upon the concentration of the acid employed, etc. The process may, for example, be carried out at 30 to 35 pounds per square inch gauge at a temperature of 268° F., or at 50 pounds per square inch gauge at 286° F., both of these conditions being such as to maintain the nitric acid aqueous. When the operation is carried out on a batch basis, higher temperatures and pressures may be employed at the initiation of the process than at a later stage, whereas more constant conditions may be desired for continuous operations. The temperature and pressure will ordinarily be varied to control the time of reaction and, therefore these conditions are not limiting.

To illustrate the process there will be described the oxidation of a Fischer-Tropsch residue having the following general composition:

33.3 parts by weight alcohols $C_4$ or higher
33.3 parts by weight aldehydes and ketones higher than $C_4$
33.3 parts by weight monocarboxylic acids $C_4$ or higher To 100 parts of the foregoing oxygenated chemicals we add 100 parts nitric acid of thirty percent $HNO_3$. This mixture is heated batchwise to 268° F. at 30 to 35 pounds per square inch gauge pressure for a period of ten to twelve hours. At the end of the oxidation period the batch is allowed to cool to approximately 212° F. and the water phase is separated from the oil phase. The water phase is withdrawn from the original reactor and is further reacted in the presence of approximately 25 percent nitric acid for a period of two to three hours to reduce the quantity of aldehydes present, which aldehydes are readily reacted to form dicarboxylic. The alcohols, aldehydes, ketones and monocarboxylic acids in the water phase have then largely been converted into dicarboxylic acids of types which are usually less than the original number of carbon atoms contained in the starting material except that succinic acid is quite stable and is not readily decomposed by heating in the presence of 25 percent nitric acid. The aqueous nitric acid solution containing the dicarboxylic acids is then cooled to 15 to 25° C. and the crystallized dicarboxylic acids are filtered to remove said crystals. The water phase, which contains for the most part the succinic acid is either re-used until the succinic acid content builds up sufficiently to justify distilling off the dilute nitric acid, or recovery of succinic acid is made by distillation and subsequent cooling and crystallization in each cycle. The nitric acid resulting from either the crystallization and filtration, or the distillation described above, is returned to the next operation, thus the nitric acid is used again and again. The nitric acid is volatilized by distillation in the oxidation operation and by reduction and vaporization from the reactor as oxides of nitrogen; these are absorbed in water and oxidized to nitric acid and then returned to the process after distillation of the water which has been picked up in the process due to oxidation of hydrogen from the several types of organic molecules in the original material charged and from water used for absorption of the oxides of nitrogen. The oxidation of the alcohols, aldehydes, ketones and monocarboxylic acids into dicarboxylic acid is carried out largely at the expense of atmospheric oxygen or air, using the nitric acid as an oxygen carrier, only a small percentage of the oxygen finally appearing in the dicarboxylic acids being actually supplied by the nitric acid molecule. For the higher molecular weight starting materials we prefer to use atmospheric air by bubbling same through the reaction mixture constantly during the reaction. Said air oxidizes a part of the oxides of nitrogen as formed to higher oxides and finally to nitric acid itself. The oxides and the volatilized nitric acid are recovered as described above in absorption towers and returned to the process for re-use.

In the oxidation of the lower molecular weight oxygenated chemicals, that is, the portion of materials $C_4$ to $C_8$ inclusive, which substances manifest a relatively high vapor pressure, we prefer to use oxygen or oxygen-enriched air in order to reduce the loss of the oxygenated chemicals by volatilization and to reduce the amount of cooling water necessary to cool the vapors leaving the reactor in order to facilitate recovery of said crude materials.

The batchwise operation described above is readily converted into a continuous operation, in which case we pass the mixture of the $C_4$ and higher oxygenated chemicals from the Fischer-Tropsch reaction together with an equal volume of 30–35 percent $HNO_3$. This mixture is passed continuously into several reactors in series at such a rate as to maintain the average dwell in the reactors at about six to ten hours, maintaining the same temperatures and pressures in the reactors as when operating batchwise. The resultant liquors are "blown down" and then the oil and water phases are separated. The recovery of dicarboxylic acids from the water phase has been described in the foregoing. Where high molecular weight crude materials, that is $C_8$ to $C_{20}$, have been used, a large portion of the high molecular weight dicarboxylic acids will be found to be present in the oil phase. The oil phase is treated countercurrently, or batchwise, with concentrated nitric acid, say 58 percent or thereabout, at a temperature of 50 to 60° C. The high molecular weight dicarboxylic acids are thus extracted from the oil phase and are recovered by cooling the nitric acid to 15 to 25° C., and the crystals are separated therefrom by filtration. The concentrated nitric acid mother liquor is used in the process as "make-up" nitric acid to supply the small amount of nitric which is lost during the operation, either as vaporized acid which is not recovered in the absorption tower, or that portion of the nitric acid which is reduced to $N_2O$ or $N_2$ gas in the oxidation operation.

Recovery of the higher dicarboxylic acids from the oil phase, as described above for the continuous operation, is applicable to the batch operation and said recovery may be handled either in a countercurrent extraction tower or by successive batch extractions in an agitated reactor.

We have described our operation at 30 to 35 pounds per square inch gauge pressure and 50 pounds per square inch gauge pressure, but the process is not limited thereto, but may be carried out at lower or higher temperatures. For example, at 100 pounds per square inch gauge we would operate at a temperature of approximately 330°

F. and our time of reaction would be reduced to six or eight hours by the increased rate of reaction at this higher temperature.

The products of the Oxo process may be oxidized under the same general conditions, using temperatures, pressures, and acid concentrations as indicated, and the preferred conditions set forth in the foregoing example may be used. The starting material may be higher in aldehyde content than the usual Fischer-Tropsch residue, but the oxidation proceeds similarly and dicarboxylic acids are produced. Whichever starting material is used, the product is a mixture of dicarboxylic acids. Depending upon the starting material, the product will contain dicarboxylic acids of greater or less molecular weight, e. g., succinic acid, glutaric acid, adipic acid, pimelic acid, suberic acid, azelaic acid, sebacic aid, etc., including branched chain dicarboxylic acids.

The foregoing is illustrative and the process is not limited thereto. The composition of the starting material may vary, depending upon the amount of acid or other oxygenated chemical separately recovered and the conditions of the Fischer-Tropsch or Oxo reaction, etc.

The invention is defined in the appended claims.

What I claim is:

1. The process of treating the mixed product obtained by a reaction of the class consisting of Oxo and of a Fischer-Tropsch reactions in which there is produced a substantial quantity of oil-soluble hydrocarbon and oxygenated compounds containing components having chains of at least 4 carbon atoms which comprises removing at least some of the water-soluble components of said mixed product by dissolving them in water and obtaining an oil which includes the oil-soluble oxygenated fraction composed largely of compounds which include a chain of at least 4 carbon atoms with at least 2 intermediate carbon atoms free from oxygen-containing substituents, separating therefrom said oil-soluble oxygenated fraction by solution thereof in a solvent in which the hydrocarbons of said oil fraction are no more than slightly soluble, and then oxidizing said oil-soluble oxygenated fraction and producing dicarboxylic acid therefrom.

2. The process of treating the mixed product of a Fischer-Tropsch reaction in which there is produced a substantial quantity of oil-soluble hydrocarbon and oxygenated compounds containing components having chains of at least 4 carbon atoms which comprises removing at least some of the water-soluble components of said mixed product by dissolving them in water and obtaining an oil which includes the oil-soluble oxygenated fraction composed largely of compounds which include a chain of at least 4 carbon atoms with at least 2 intermediate carbon atoms free from oxygen-containing substituents, separating therefrom said oil-soluble oxygenated fraction by solution thereof in a solvent in which the hydrocarbons of said oil fraction are no more than slightly soluble, and then oxidizing said oil-soluble oxygenated fraction with nitric acid and air and thereby obtaining dicarboxylic acid.

3. The process of treating a mixture of oxygenated components obtained by a Fischer-Tropsch process in which there is produced a substantial quantity of oil-soluble hydrocarbons and oxygenated compounds containing components having chains of at least 4 carbon atoms, which comprises treating with a relatively weak nitric acid in the presence of air at least some of the mixture of oxygenated components in which there is a chain of at least four carbons in length with no oxygen-containing substituents attached to at least two intermediate carbons thereby converting at least some of said components to dicarboxylic acid, separating the resulting aqueous solution from water-immiscible components, then adding a relatively concentrated nitric acid to dissolve dicarboxylic acids from said water-immiscible components, separating the dicarboxylic acids from the nitric acid by cooling, and thereafter using the resulting aqueous nitric acid for oxidation of additional oxygenated components.

4. The process of producing dicarboxylic acids which comprises oxidizing with nitric acid in the presence of added oxygen, a mixture of oil-soluble oxygenated compounds from a reaction of the class consisting of the Oxo and Fischer-Tropsch processes, which mixture is composed largely of compounds which include a chain of at least four carbon atoms with at least two intermediate carbon atoms free from oxygen-containing substituents and which mixture is difficult of separation; and separating dicarboxylic acid from the oxidation product.

5. The process of claim 4 in which the oxidation is carried out in the presence of aqueous nitric acid at a temperature of about 212° F. and under pressure which keeps at least some of the nitric acid in aqueous form.

6. The process of claim 4 in which an oil-soluble residue of oxygenated compounds from a Fischer-Tropsch reaction is oxidized by air in the presence of aqueous nitric acid.

7. The process of claim 4 in which the mixture is obtained from an Oxo reaction product and is oxidized by air in the presence of aqueous nitric acid.

References Cited in the file of this patent

UNITED STATES PATENTS

| | | |
|---|---|---|
| 2,054,979 | Jahrstorfer et al. | Sept. 22, 1936 |
| 2,151,106 | Hentrich et al. | Mar. 21, 1939 |
| 2,298,387 | Kenyon et al. | Oct. 13, 1942 |
| 2,323,861 | Zellner | July 6, 1943 |
| 2,415,102 | Landgraf et al. | Feb. 4, 1947 |
| 2,522,619 | Harban et al. | Sept. 13, 1950 |
| 2,594,341 | Owen et al. | Apr. 29, 1952 |
| 2,662,908 | Logan | Dec. 15, 1953 |